(12) United States Patent
Marelas

(10) Patent No.: US 11,436,190 B2
(45) Date of Patent: Sep. 6, 2022

(54) VAULTING DATA FROM A PUBLIC CLOUD

(71) Applicant: EMC IP Holding Company LLC, Hopkinton, MA (US)

(72) Inventor: Peter Marelas, Donvale (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 486 days.

(21) Appl. No.: 16/507,564

(22) Filed: Jul. 10, 2019

(65) Prior Publication Data

US 2021/0011880 A1      Jan. 14, 2021

(51) Int. Cl.
  *G06F 16/00* (2019.01)
  *G06F 16/11* (2019.01)
  *G06F 3/06* (2006.01)
  *G06F 9/50* (2006.01)

(52) U.S. Cl.
  CPC ......... *G06F 16/113* (2019.01); *G06F 3/0605* (2013.01); *G06F 3/065* (2013.01); *G06F 3/067* (2013.01); *G06F 3/0641* (2013.01); *G06F 3/0664* (2013.01); *G06F 3/0665* (2013.01); *G06F 9/5016* (2013.01)

(58) Field of Classification Search
  None
  See application file for complete search history.

(56) References Cited

U.S. PATENT DOCUMENTS

| | | | | |
|---|---|---|---|---|
| 8,612,439 | B2 * | 12/2013 | Prahlad | H04L 67/28 707/736 |
| 10,635,642 | B1 * | 4/2020 | Haggerty | G06F 21/31 |
| 2019/0265904 | A1 * | 8/2019 | Nakamura | G06F 3/0665 |
| 2020/0201827 | A1 * | 6/2020 | Chacko | G06F 21/6218 |

* cited by examiner

*Primary Examiner* — Bai D Vu
(74) *Attorney, Agent, or Firm* — Staniford Tomita LLP

(57) ABSTRACT

A public cloud is owned by a first entity and a cloud vault target is owned by a second entity, different from the first entity. A data moving micro-service is deployed to the public cloud and another data moving micro-service is deployed to the cloud vault target. A request is issued to the public cloud for a snapshot of data to vault to the cloud vault target. The snapshot is accessed to write the data to a cloud volume in the public cloud. The data moving micro-service at the public cloud and the other data moving micro-service at the cloud vault target coordinate to read the data in the cloud volume, and deduplicate and replicate the data in the cloud volume from the public cloud to the cloud vault target.

18 Claims, 11 Drawing Sheets

VAULTING DATA FROM A PUBLIC CLOUD

TECHNICAL FIELD

The present invention relates generally to information processing systems, and more particularly to safeguarding data.

BACKGROUND

A tape vault is a portable storage device. A tape vault is used to vault data from customer data centers to secure offsite facilities. Specifically, tape vaulting involves copying the data onto the portable device (e.g., backup-tape or portable hard-drive) and physically transporting the device, such as by a cargo van, to the secure vault facility. These secure offsite locations can facilitate customers' compliance, security and disaster recovery requirements. "Data heavy" customers can have a particular need for safeguarding data. Data heavy industry players include highly regulated and security conscious industries (banking, finance, healthcare, insurance, defense). As customers move workloads to the public cloud the need to vault copies remains.

Vaulting data can be extremely expensive and error-prone due to the manual labor involved in copying and physically transporting the data. For example, the data needs to be copied to the tape vault. Each trip to a customer site to pickup the tape vault and transport the tape to the vault facility is a cost that is invoiced to a customer. Depending upon the data protection policies of the customer, there can be weekly pickups, multiple pickups per week, daily pickups, or even multiple pickups per day. The costs to vault data to offsite storage can quickly add-up.

There is a need for improved systems and techniques for data vaulting.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
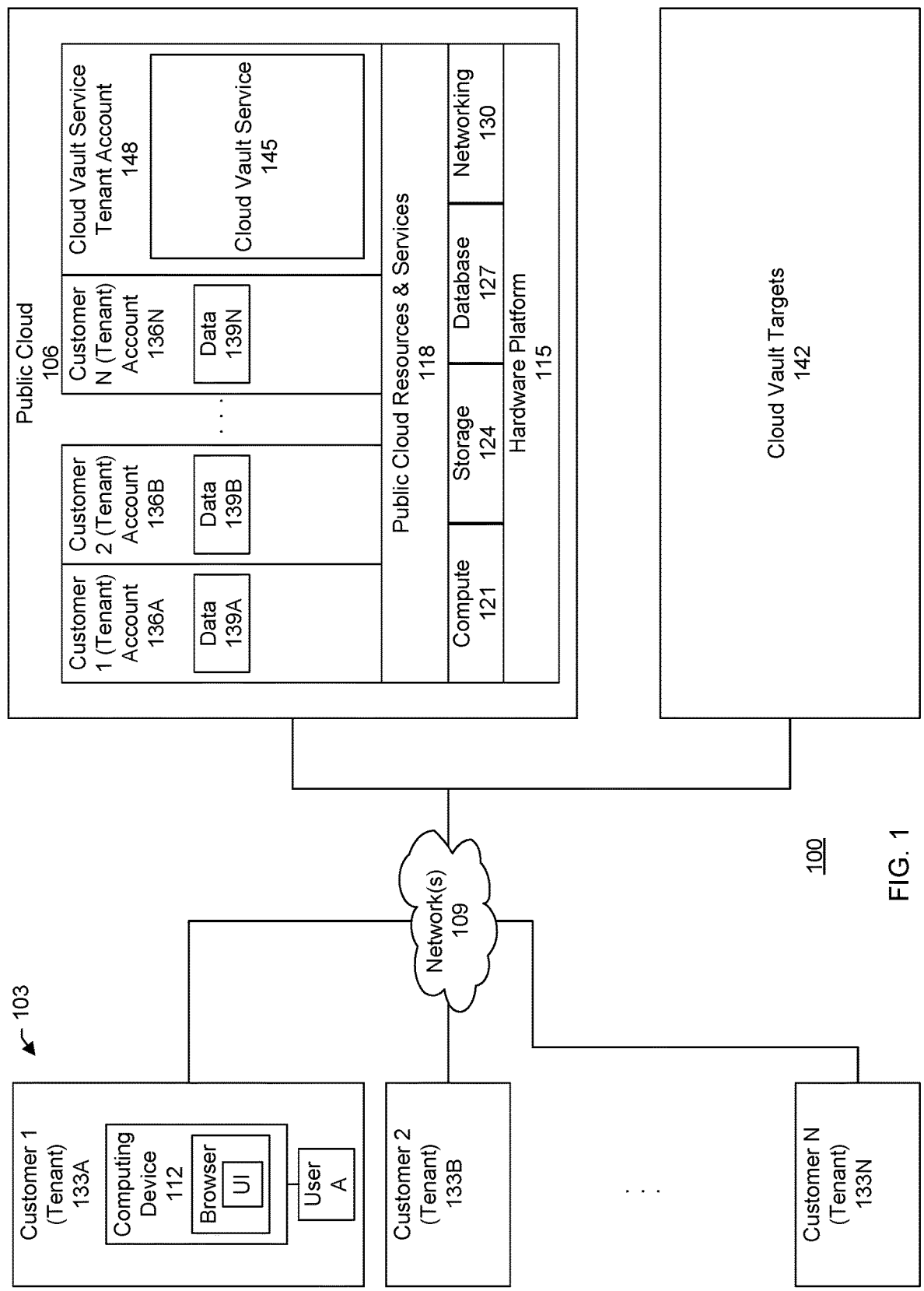
FIG. 1 shows a block diagram of an information processing system for vaulting data from a public cloud to a cloud vault target, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

Disclosed herein are methods and systems for efficiently vaulting data from a public cloud by sending copies of the data, over a network, to a secure offsite facility where the data can be protected from loss, corruption, theft, natural disasters, and other threats. FIG. 1 shows a block diagram of an information procession system 100 within which methods and systems for vaulting data from a public cloud may be implemented according to one or more embodiments. In the example shown in FIG. 1, there are multiple customers 103 that connect to a public cloud 106 via a network 109.

A customer may be referred to as a tenant in the public cloud. The customer tenants use computing devices 112 to connect and communicate with the public cloud and utilize the services provided by the public cloud. Examples of computing devices a tenant user may use to communicate with the public cloud include desktop computers, laptops, mobile communication devices (e.g., smartphones or tablets), servers, Internet of Things (IoT) devices, and other types of computing devices. In an embodiment, a tenant user uses a web browser program executing on the tenant computing device to interact with the public cloud.

The public cloud may be implemented on an hardware platform 115 that uses a distributed computing model or multi-tenant architecture involving many thousands of servers that may operate in different geographical regions. Examples of public clouds include Amazon Web Services® (AWS Cloud) as provided by Amazon, Inc. of Seattle, Wash.; Microsoft Azure® as provided by Microsoft Corporation of Redmond, Wash.; Google Cloud® as provided Alphabet, Inc. of Mountain View, Calif.; and others. The public cloud makes resources available as services 118 to its tenants over the network (e.g., internet).

Some examples of resources or services that may be provided by the public cloud include compute 121, storage 124, database 127, and networking 130. For example, Amazon Elastic Cloud Compute (EC2) is a service that allows for creating and managing virtual servers. An EC2 instance is a virtual server in Amazon's Elastic Compute Cloud (EC2) for running applications on the Amazon Web Services (AWS) infrastructure. An instance provides compute, memory, and storage to run a customer's application or software on the particular instance.

As another example, Amazon Simple Storage Service (S3) provides storage for customer data or objects. Data objects may be stored in logical containers referred to as buckets. Amazon Elastic Block Store (EBS) provides persistent block storage volumes for use with Amazon EC2 instances in the AWS Cloud. Some embodiments are described in conjunction with products and services associated with specific public cloud providers such as Amazon AWS. It should be appreciated, however, that aspects and principles of the systems and techniques described can be applied to other public clouds provided by other public cloud providers (e.g., Microsoft Azure, Google Cloud, or others).

Other examples of cloud services include analytics, applications, virtual machines (VM), developer tools, and many others. The customer tenants may be charged based on their usage of the public cloud. For example, a customer tenant may pay a monthly charge based on an amount of data stored in the public cloud, an amount of data transferred between the public cloud and the customer tenant's computer system, a number of operations performed, and so forth.

Each tenant's data (and the applications and services they wish to run) in the public cloud, however, can remain isolated from other tenants in the cloud. For example, a first customer tenant 133A may have a first cloud account 136A in the public cloud, and a second customer tenant 133B may have a second cloud account 136B in the public cloud. Data 139A associated with the first tenant is stored in the first cloud account belonging to the first tenant and is isolated from the second cloud account belonging to the second tenant. Likewise, data 139B associated with the second tenant is stored in the second cloud account belonging to the second tenant and is isolated from the first cloud account belonging to the first tenant.

In many cases a customer may wish to obtain a copy of their data from the public cloud for archival storage in a remote offsite vault. The remote offsite vault may be owned by an entity different from an entity providing the public cloud. For example, the remote offsite vault may be implemented on infrastructure separate from the infrastructure upon which the public cloud is implemented (e.g., different storage media, different server machines, different magnetic shielding controls, or different climate control and fire suppression systems within the data centers).

The entity that owns or manages the remote offsite vault may have security protocols different from the security protocols of the entity that owns or manages the public cloud (e.g., different chain of custody controls, different data retrieval processes, different data access processes, different trust management, different authorization mechanisms, different access policies, or different restrictions).

While many customers may also perform backups, vaulting data is very different from typical backups of data. For example, vaulting and backing up may be performed at different frequencies or intervals. For example, data may be backed up at a first frequency and vaulted at a second frequency, different from the first frequency. The first frequency may be greater than the second frequency. The authorization and authentication mechanisms to access the data in the public cloud (including a backup of data in the public cloud) may be different from the authorization and authentication mechanisms to access the data in the vault. In an embodiment, a primary purpose of the vault is to preserve and maintain custody of business-critical data whereas a backup may be to restore data quickly.

These differences can make it more difficult to access the vaulted data as compared to a typical backup in which there is a high-level of trust between the primary system and the backup system. The high-level of trust allows the primary system to be recovered very quickly from the backups. The lower-levels of trust between the public cloud and the vault, and the greater degree of separation between the public cloud and the vault as compared to a typical backup system, however, is by design.

Specifically, the separation of duties associated with having the vaulted data managed by a separate entity helps the customer to reduce their exposure to risk (e.g., cascading failures) by spreading the data across a different entity. The data is not tied to a single specific infrastructure (e.g., public cloud). In a specific embodiment, the Cloud Vault Service is designed to provide the customer with another layer of protection against data loss by making it easy, efficient, and cost-effective to transfer data out of the public cloud for archival storage at a separate offsite facility unrelated to the public cloud. For example, if the provider of the public cloud should unexpectedly shut-down or suffer a disaster, system-wide attack, or data center crash that happens to also affect the backups maintained in the public cloud, the customer will still be able to rely on the vaulted copy in order to continue business operations. The vaulted copy can be available as a last resort after backup recoveries and other approaches to recover the data have failed.

Traditional techniques of vaulting data from a public cloud are highly inefficient and very costly. Indeed, a provider of the public cloud generally has a very strong incentive to keep its customers within the public cloud ecosystem. Once an enterprise becomes a customer of the public cloud provider and begins to consume the vast array of cloud products and services offered by the public cloud provider, the corresponding data of the customer becomes tightly integrated into the infrastructure of the public cloud. For example, the provider of the public cloud may provide for backups. Such backups are conducted within the public cloud, rely on services provided by the public cloud, and are maintained on infrastructure within the public cloud. Thus, backups and subsequent restorations can be performed very quickly and easily, but remain within the public cloud ecosystem and under the control of the public cloud provider. Customers have very little vaulting options when data and workloads move to a public cloud as the public cloud holds data hostage for control.

In a specific embodiment, a Cloud Vault system is provided that allows for efficiently vaulting data of a customer tenant out of the public cloud to one or more Cloud Vault Targets 142 (and efficiently recalling the vaulted data from a Cloud Vault Target back to the public cloud or to a different public cloud). There is no dependence on physically transporting storage media. In this specific embodiment, an entity owning or controlling the Cloud Vault Targets is different from an entity providing the public cloud. As discussed above, having the vaulted data managed by an entity separate from the entity providing the public cloud provides another layer of security and protection against data loss.

In a specific embodiment, the Cloud Vault includes a Cloud Vault Service (CVS) 145 that is provided in the public cloud. The Cloud Vault Service executes within a tenant cloud account 148 in the public cloud to vault data of the customer tenants in the public cloud to the one or more Cloud Vault Targets.

In a specific embodiment, the Cloud Vault Targets include object storage. Object storage is a computer data storage architecture that manages data as objects, as opposed to other storage architectures like file systems which manage data as a file hierarchy, and block storage which manages data as blocks within sectors and tracks. Each object typically includes the data itself, a variable amount of metadata, and a globally unique identifier. The metadata can include various identifying information for each piece of data. Objects are stored in a flat address space, which can facilitate locating and retrieving data. Object storage is considered more scalable than other storage architectures such as a file storage in which data (e.g., files) are placed in folders and organized as a hierarchy with directories and subdirectories. In another specific embodiment, the cloud vault targets instead or additionally include a file system storage, block storage, or combinations of these.

In a specific embodiment, the Cloud Vault allows customers of public clouds to subscribe to a service (e.g., Cloud Vault Service) that manages data vaulting with little or no human intervention. In a specific embodiment, the Cloud Vault Service is provided by an entity different from the provider of the public cloud.

Presently public cloud providers offer customers the ability to export data on mass to portable storage devices. For example, Amazon AWS provides a device referred to as AWS SnowBall. This device is shipped to the customer's location for processing. These devices play the role of tape transport boxes used by data vaulting providers. However, that is where the similarities end. Services like SnowBall are not designed for regular data vaulting because they involve significant human capital to operate which is costly and error prone. The process involves no less than 12 steps outlined below.

1) Taking snapshots of cloud volumes.
2) Waiting for volumes to copy to S3.
3) Creating a volume from the S3 snapshot.
4) Copying the volume to another S3 buckets (e.g., vaults).
5) Creating a SnowBall job in the AWS console.
6) Waiting for AWS to export S3 buckets to SnowBall device.
7) Waiting for AWS to dispatch the SnowBall device.
8) Waiting for a shipping carrier (e.g., UPS®) to ship the SnowBall device to the location.
9) Connecting the SnowBall device to a network.
10) Taking a data dump of the SnowBall device to an alternative storage device.
11) Disconnecting the SnowBall device from the network.
12) Shipping the SnowBall device back to AWS.

Human capital is not the only obstacle preventing SnowBall like devices from being used for regular data vaulting. There is significant time that passes between the snapshot of a cloud volume (which contains the data to vault) and the time it takes to reach its final resting place. In many cases a single cycle will take weeks to complete which is not in-line with existing tape vaulting services that operate on daily and weekly cycles. The economics of SnowBall are also clearly designed for infrequent bulk data movement. This is due to the shipping fees, which can reach hundreds to thousands of dollars per cycle and the human capital required to complete a cycle. And finally, SnowBall like services cannot address the bottom end of the market where the amount of data that requires vaulting is small. For example, the minimum capacity available in a SnowBall device is 50 terabytes (TBs).

Figure 2:
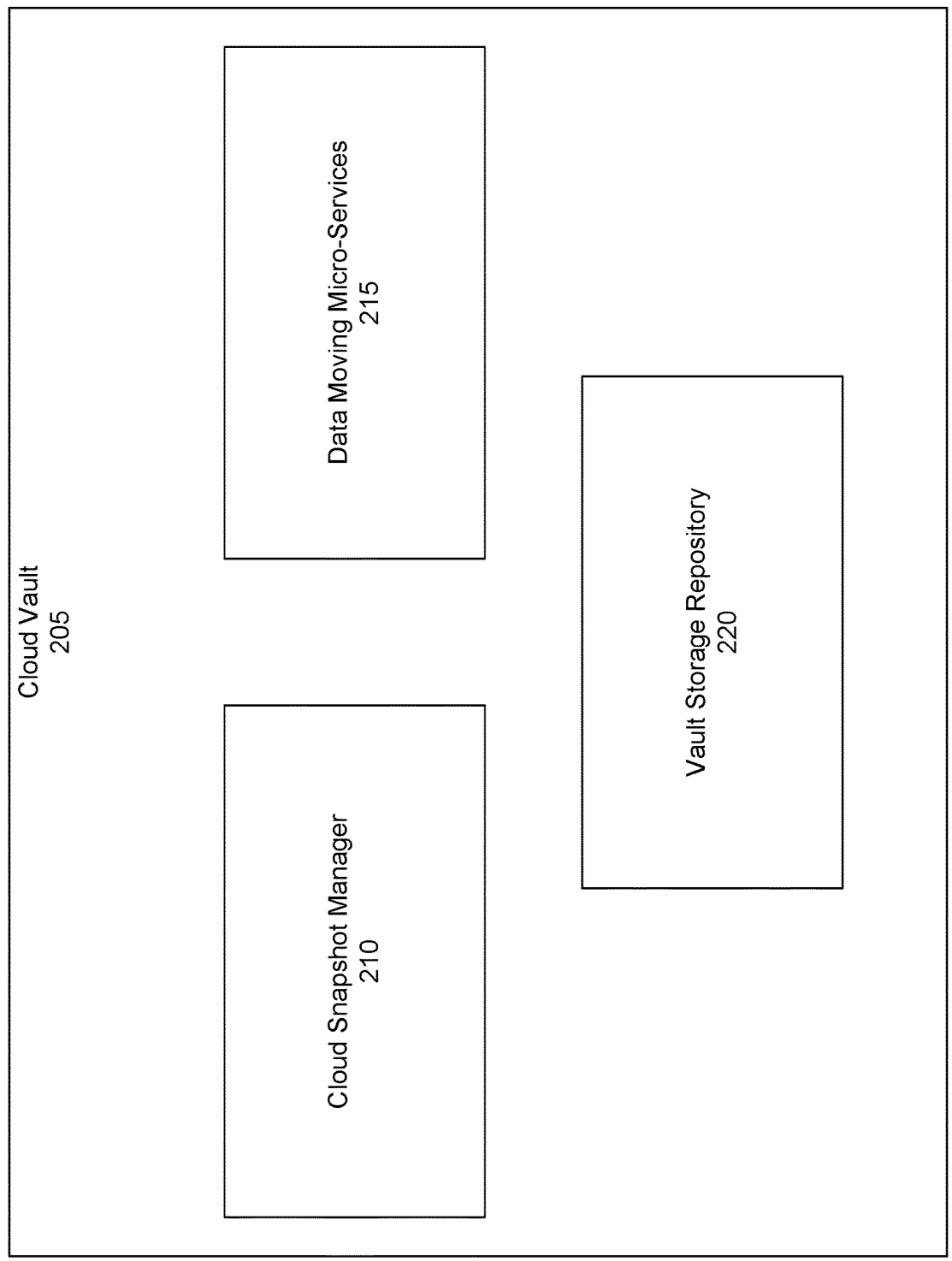
FIG. 2 show components of a cloud vault system, according to one or more embodiments.

FIG. 2 shows a simplified block diagram of a Cloud Vault System 205 that provides a Cloud Vault Service according to one or more embodiments. The Cloud Vault Service is designed to facilitate vaulting data from customers' public cloud accounts to secure offsite vaulting facilities. There are no tapes or portable devices involved. The service is delivered over public cloud providers' existing networks and employs data transport technologies that minimize or reduce the consumption of networking resources and data storage.

As shown in the example of FIG. 2, this system includes several components including a Cloud Snapshot Manager (CSM) 210, data moving micro-services 215, and vault storage repository 220. The Cloud Snapshot Manager forms the control plane of the Cloud Vault. In an embodiment, the Cloud Snapshot Manager provides an interface where customers can interface with the Cloud Vault Service through a web browser to define vaulting policies, specify or identify the data sources or data sets to vault, specify a schedule or frequency at which the data is to be vaulted, identify one or more Cloud Vault Targets as a destination for the vaulted data, provide credentials to allow the Cloud Vault Service to vault the data, and authorize access by the Cloud Vault Service to the data in the public cloud account of the customer. In a specific embodiment, the interface provided by the Cloud Snapshot Manager is a graphical user interface (GUI). Instead or additionally, the interface may be a programmatic interface or be exposed via an application programming interface (API).

The Cloud Snapshot Manager is responsible for automating the management of snapshot generation that may be provided by the various public clouds. In other words, each public cloud may provide a native snapshot generator or service. Different versions of the Cloud Snapshot Manager are configured to interface with a respective public cloud to request and manage snapshots from the respective public cloud.

For example, the Cloud Snapshot Manager may be configured to automate the management of AWS and Azure native snapshot technologies. In particular, in a specific embodiment, the Cloud Snapshot Manager includes functions and logic to vault (take copies of) the public cloud native snapshots (e.g., AWS or Azure native snapshots) to offsite storage targets based on the customer's defined policies. For example, a customer is able to define a policy that instructs the Cloud Snapshot Manager to vault copies of specific cloud volumes on a specific interval or schedule to a specific storage target. One example of a Cloud Snapshot Manager is the Dell EMC Cloud Snapshot Manager as provided by Dell EMC of Hopkinton, Mass.

The data moving micro-services are responsible for the efficient movement of data between the public cloud and one or more Cloud Vault Targets. The data movements include vaulting data—e.g., moving data from the public cloud to the Cloud Vault Target; and recalling data—e.g., moving data from the Cloud Vault Target back to the public cloud. Data movement operations may include deduplication operations (e.g., data reduction), replication operations, data compression operations, encryption operations, or combinations of these. In a specific embodiment, the public cloud and a Cloud Vault Target are connected using Transmission Control Protocol/Internet Protocol (TCP/IP) across a network (e.g., local network, public network, or both). The data moving micro-services transport the data using TCP/IP.

"Micro-service" refers to a method of developing software applications as a suite of independently deployable, small, modular services in which each service runs a unique process and communicates through a well-defined, lightweight mechanism to serve a particular goal. The microservice application is developed as a collection of services that are independently deployable and scalable. In illustrative embodiments, such a framework is implemented in a cloud environment, such as one that executes one or more container clusters, which include features such as scalability, fault-tolerance, extensibility and fast deployment and scheduling. Each service instance may be provided with the appropriate CPU, memory, and I/O resources. The microservice application monitors functional components to detect increases and decreases in activity. When an increase in activity is detected, a number of instances of the microservice can be increased. Conversely, when a decrease in activity is detected, the number of instances of the microservice can be decreased.

In a specific embodiment, the data moving micro-services are deployed in a micro-services architecture on top of a Kubernetes cluster. Kubernetes is an open-source container-orchestration system for automating application deployment, scaling, and management of containerized applications. The Kubernetes cluster can run in the public cloud or on-premises and is designed to scale services on-demand.

In a specific embodiment, the data movement microservice application fulfills two requirements of the Cloud Vault Service. In this specific embodiment, the microservice application is deployed in each public cloud in a cloud account (e.g., cloud vault service tenant account) where the Cloud Vault Service is offered. The micro-service application is used internally to store a small number (e.g., less than 3) of versioned copies of the customers' cloud volumes so they can be transported efficiently (using deduplicated replication) to the customers' desired Cloud Vault Target(s). A micro-service instance is also deployed as the entry point for each Cloud Vault Target. These offsite instances receive the deduplicated data from the microservice instances hosted in the public clouds where the Cloud Vault Service is running. The offsite instances consume object storage in the vault storage repository for the backing store. An example of object storage that may be used for the vault storage repository is the Dell EMC Elastic Cloud Storage (ECS).

The vault storage repository provides a target for the customer data (e.g., cloud volumes) vaulted from the public cloud. In a specific embodiment, the vault storage repository provides private object storage. The object storage may be procured as a scale-out appliance. In a specific embodiment, the Cloud Vault Targets reside in offsite facilities. These facilities may be managed by third-party companies associated with the Cloud Vault Service including Data Vaulting companies that wish to participate in the Cloud Vault Service. As discussed, each object storage deployment to a Cloud Vault Target is combined with a deployment of the data movement micro-service to facilitate the efficient storage (via data deduplication) and efficient transport (via deduplicated replication) necessary to vault large quantities of data (Cloud Volumes) from public cloud providers (e.g., AWS, Azure and Google Cloud) to the Cloud Vault Targets.

Figure 3:
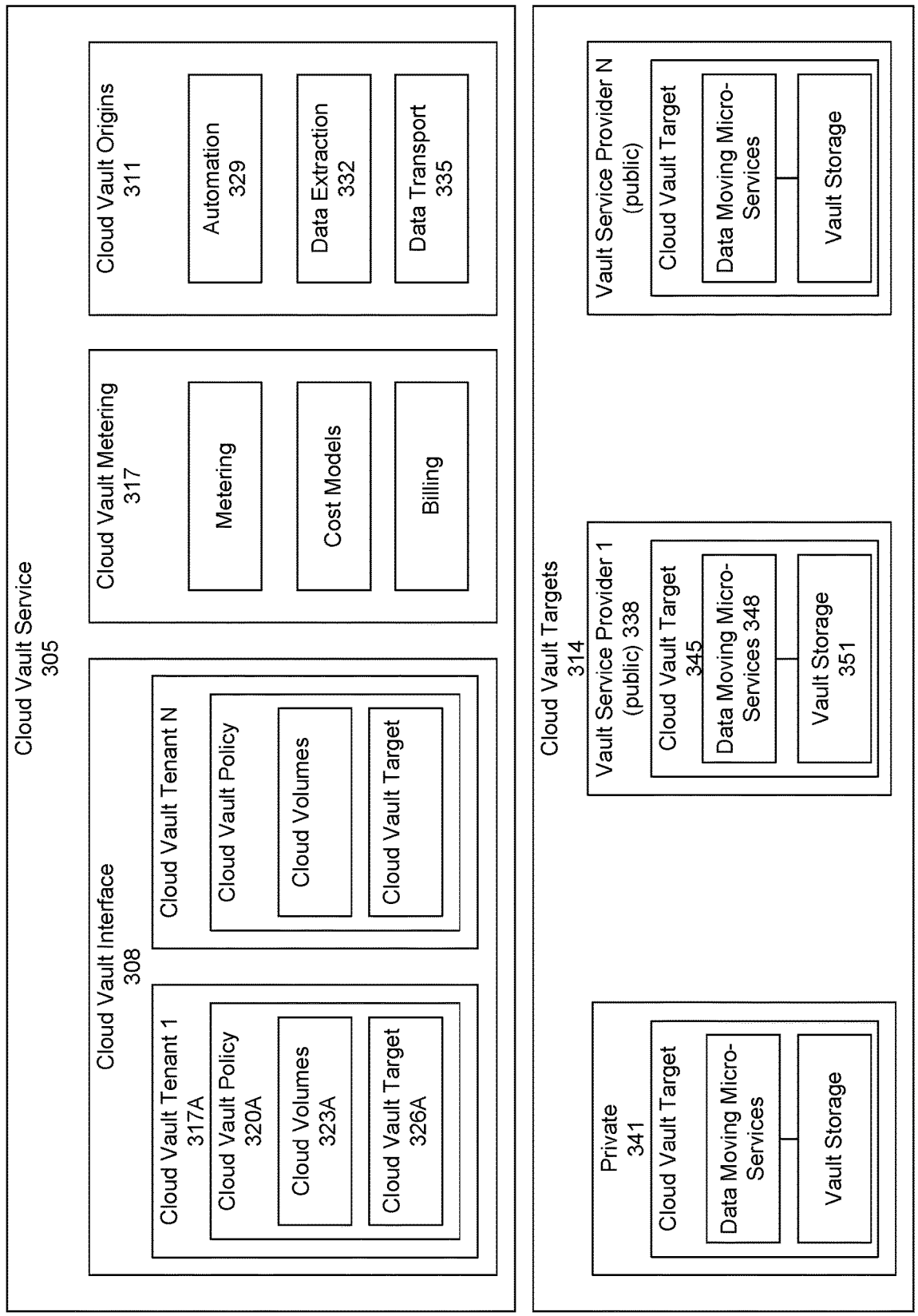
FIG. 3 shows a high-level diagram of a cloud vault service, according to one or more embodiments.

FIG. 3 shows a block diagram of a Cloud Vault Service 305 in further detail according to one or more embodiments. In this specific embodiment, the Cloud Vault Service (CVS) is a subscription service that enables public cloud customers to store copies of their cloud data in secure offsite vaults. In this specific embodiment, a property of these vaults is that they are independently owned and operated and have no infrastructure dependency on the public cloud providers' resources, where the data originates. This is what makes them satisfy the properties of secure data vaults.

The Cloud Vault Service (CVS) includes four key components: Cloud Vault Interface 308, Cloud Vault Origins 311, Cloud Vault Targets 314, and Cloud Vault Metering 317.

The Cloud Vault Interface (CVI) provides customers the ability to subscribe to the service and manage their vaulting policies. Customers can choose the data sources such as the cloud instances, data volumes and logical storage containers (e.g., AWS S3 buckets) present in public cloud accounts to vault. These resources can span different public cloud providers where a Cloud Vault Origin (CVO) is available. A data source may include block volumes in a public cloud, objects in public cloud object stores, relational database services in the public cloud, or combinations of these.

More specifically, a cloud vault tenant 317A can use the cloud vault interface to define a cloud vault policy 320A. The cloud vault policy allows the tenant to identify and define the data source objects (e.g., cloud volumes 323A) to be vaulted, a cloud vault target 326A (e.g., destination), vaulting frequency (e.g., daily, weekly, or any other frequency as desired) or schedule, retention periods, and enable or disable other settings, options, and parameters (e.g., security, encryption, immutability).

Cloud Vault Origins provides automation 329, data extraction 332 and data transport services 335 necessary to facilitate the movement of data from a public cloud provider point of presence. The Cloud Vault Origin runs in the public cloud under the account of the Cloud Vault Service provider in the public cloud. Customers can associate their public cloud resources to Cloud Vault Policies (CVP) that define how frequently the objects are vaulted, how long the vaulted copies are retained, how they are secured (encryption, immutability) and where they are stored (Cloud Vault Targets). The CVI is the main interface customers of the Cloud Vault Service and is accessed securely using a web browser with appropriate credentials.

Cloud Vault Targets (CVT) are specific environments where the CVS service transports data for storage. A CVT can reside anywhere in the world where there is compute, storage and network infrastructure available to host the Cloud Vault Target and make it accessible by the CVS. There are two types of Cloud Vault Targets: public 338 and private 341.

Public CVTs are supplied by commercial entities such as existing tape vault service providers (e.g., Iron Mountain Inc. of Boston, Mass.). These are owned and operated by commercial entities that want to participate in the CVS. The owner of the CVT is responsible for establishing the service, providing network connectivity to public cloud providers and setting the consumption-based price model for the service. CVTs established by commercial entities operate in the same vein to public cloud object storage. The technology required to run and operate a CVT is supplied by the provider of the CVS for an upfront cost as either software or a physical appliance.

Private CVTs can be for customers that are large enough to have the option of hosting their own CVT. For example, a customer with sufficient resources may decide to operate their own private data center and host a Cloud Vault Target rather than outsourcing the hosting to a vault service provider. As with commercial entities, customers may need to purchase software or a physical appliance from the CVS to establish the CVT. The option to target different CVTs for a particular CVP are present in the CVI interfaces.

As shown in the example of FIG. 3, each cloud vault target, such as a Cloud Vault Target 345, includes a data moving micro-service 348 and storage 351 (e.g., AWS S3 compliant storage). The data moving micro-service at the Cloud Vault Target coordinates with a corresponding data moving micro-service at the public cloud to efficiently replicate source data objects at the public cloud to the Cloud Vault Target; and to efficiently recall the vaulted data from the Cloud Vault Target back to the public cloud.

Cloud Vault Metering (CVM) provides the services necessary to monetization, meter and bill customers of the CVS. The CVM is aware of the capacity a Cloud Vault customer is consuming from CVTs and bills customers according to the costs published by CVT providers. Two pricing models may be established to delineate between commercial and customer supplied CVTs. The CVTs owned and operated by commercial entities may be required to publish their pricing model to the CVS and the CVM enforces the pricing model on customers by billing them on behalf of the CVT provider. This way the customers of the CVS only have to deal with one entity when it comes to billing. The CVS provider may incur costs associated with data transportation to the CVT and may recover these costs along with a margin by billing CVS customers on behalf of the CVT. The CVM may meter customers' resource usage on a daily basis and may bill CVS customers on a monthly basis. The CVM may also distribute funds to CVTs to cover the costs associated with consuming CVT providers resources.

The Cloud Vault Target providers may choose to offer value added services on-top of the Cloud Vault Service. For example, they may offer the ability to convert vaulted copies to compatible data formats and images that can be accessed by the Cloud Vault Service customer. A service such as this may be used to facilitate disaster recovery from data vaults or leverage data vaults for data discover requirements, data forensic and data security analysis.

In an embodiment, the CVS may not be responsible for the customers' data once it enters the vault. This responsibility may be applied between the CVS customer and CVT directly by establishing the terms and conditions between the two entities. This way if the CVS service ever ceases to exist CVS customers will still have access to their data subject to the terms and conditions set out by the CVT provider.

The Cloud Vault Interface provides customers the ability to vault data and recover data from the vault where there exists a CVO. The CVS can facilitate the following use cases: 1) Data Compliance, 2) Data Security, 3), Cloud Data Disaster Recovery, and 4) Cloud Data Migration. In a specific embodiment, the CVOs leverage the elasticity available with the data movement micro-services to facilitate the data extraction and data transport to Cloud Vault Targets. This helps to ensure the CVOs consume minimal or little public cloud services while there is no demand or activity. In this specific embodiment, the CVTs leverage corresponding data movement micro-services running on hyper-converged infrastructure consuming object storage.

Figure 4:
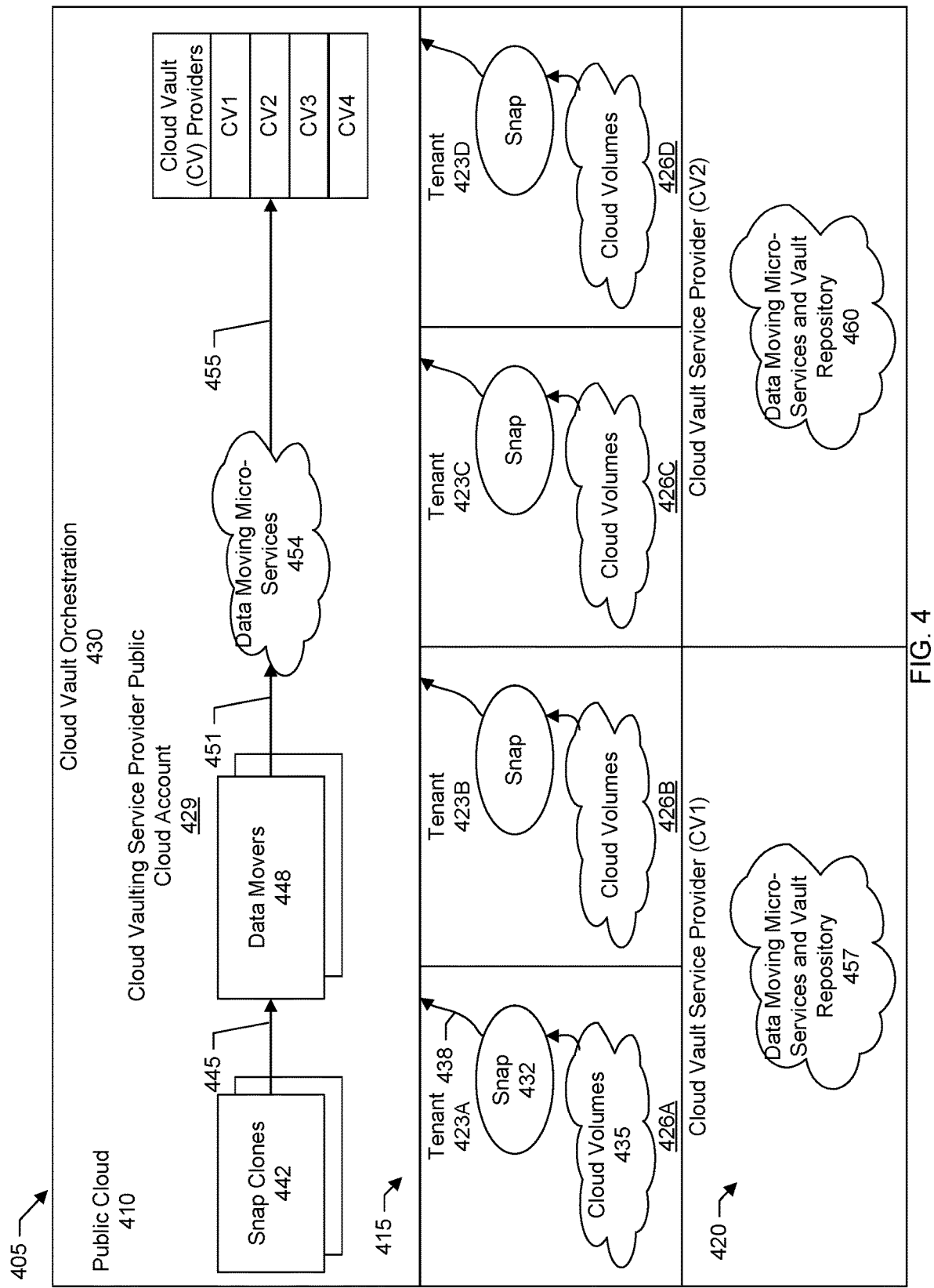
FIG. 4 shows a block diagram illustrating vaulting data from a public cloud to a cloud vault target, according to one or more embodiments.

FIG. 4 shows another block diagram of a system 405 for a Cloud Vault according to one or more embodiments. As shown in the example of FIG. 4, there is a public cloud 410, multiple customer tenants 415 in the public cloud, and service providers 420 providing Cloud Vault Targets.

Each customer tenant has an account in the public cloud. For example, a first tenant 423A has a first account 426A in the public cloud. A second tenant 423B has a second account 426B in the public cloud. A third tenant 423C has a third account 426C in the public cloud. A fourth tenant 423D has a fourth account 426D in the public cloud. FIG. 4 shows four customer tenant accounts. It should be appreciated, however, that this is merely for purposes of example. There can be many thousands or even millions of customer tenant accounts in the public cloud. The provider of the Cloud Vaulting Service also has a tenant account 429 in the public cloud.

In a specific embodiment, public cloud customers subscribe to the Cloud Vault Service where they are able to select the data sources or data sets (e.g., public cloud volumes, relational database instances and logical storage containers (e.g., AWS S3 buckets)) they wish to vault. Customers can define characteristics of the service by defining policies that map the customers' desired outcomes to facilitate vaulting of data to Cloud Vault Targets.

The process of vaulting data from the public cloud is public cloud dependent to cater to nuisances present in each public cloud providers' platform. For example, when customers of the Amazon AWS cloud wish to vault data present in EC2 instances and EBS volumes in AWS, the Cloud Vault Service leverages AWS snapshots to create the source dataset for generating Cloud Volumes ready for vaulting. Specifically, the Cloud Vault Service orchestrates 430 AWS snapshots 432 for customers' EC2 and EBS instances 435 and then clones 438 these to independent EBS volumes 442 where they are mounted 445 to data mover servers 448 running in public cloud account 429 of the Cloud Vault Service provider. These data mover servers read data from the cloned volumes and write 451 them as objects to an instance of data moving micro-services 454 also running in the cloud account of the Cloud Vault Service provider. The data moving micro-services then replicates 455 the objects to the customers' desired Cloud Vault Target (e.g., Cloud Vault Target 457, Cloud Vault Target 460).

In a specific embodiment, at least one copy of the customers' cloud volumes is retained in the data moving micro-services at the public cloud to facilitate efficient deduplicated replication to the Cloud Vault Target on an ongoing basis. Customers can be given the option to retain multiple local copies of the cloud volumes which can reside in the data moving micro-services. Having multiple local copies of the cloud volumes residing in the data moving micro-services can further help to improve the performance of the data movement operations (e.g., deduplication operations, replication operations). There can be additional storage costs, however, for maintaining multiple local copies. The Cloud Vault Service is flexible and lets individual customers decide how to balance cost and performance. For example, in an embodiment, a customer tenant can specify via a policy the number of local copies of the cloud volumes to retain at the public cloud.

The Cloud Vault Service manages the retention of the snapshots in the public cloud, the local copies stored in the Cloud Vault Service's instance of the data moving micro-services and the vaulted copies in the Cloud Vault Targets running at the Cloud Vault Service Providers. Customers can have the option of recalling data from either the instance of the data moving micro-service or the Cloud Vault Targets. Recalling data from the instance of the data moving micro-service can be faster than recalling data from the Cloud Vault Targets as the Cloud Vault Targets may be remote, may have additional or different access protocols for security, or combinations of these. However, in some cases, a customer may desire the fidelity of recalling from a Cloud Vault Target or may wish to recall to a different public cloud from where the data was originally vaulted.

The customer can browse all copies online and choose which copies they wish to recall back into their public cloud accounts. If the copy the customer wishes to recall is present in a Cloud Vault Target, the process leverages a reverse replication approach where the objects necessary to fulfill the request are replicated back to the public cloud instance of the data moving micro-service. From there the data is copied by the cloud servers into the customers' public cloud account where it can be accessed. Alternatively, if the copy the customer wishes to recall is present in the public cloud instance of the data moving micro-service, the copy is mounted on the data mover server and copied into a new volume created in the customers' public cloud account.

Some customers may be sensitive to security and may desire that all data managed by the Cloud Vault Service reside in one of the customer's public cloud accounts rather than the cloud account of the Cloud Vault Service. In a specific embodiment, this requirement is facilitated by requiring the customer to deploy a data mover in their cloud account that the Cloud Vault Service can orchestrate via API and requiring the instance of the data moving micro-service to store a specific customer's (tenant) data in a specific container (e.g., S3 bucket) that is present in the customer's cloud account. This approach can also simplify billing as the customer will directly incur the public cloud cost of the data mover and storage (e.g., S3 storage) to support the Cloud Vault Service.

Figure 5:
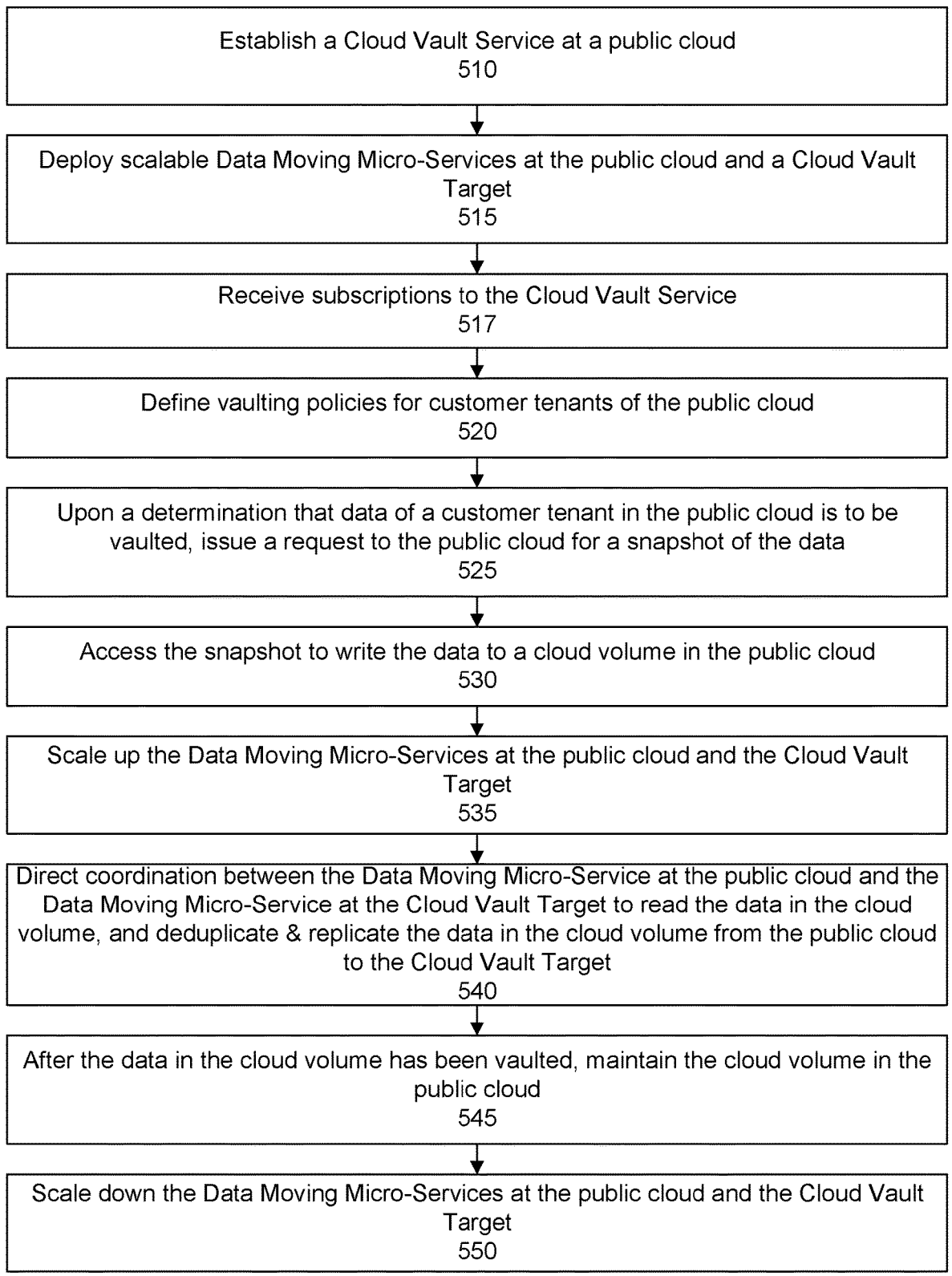
FIG. 5 shows an overall flow of a cloud vault service, according to one or more embodiments.

FIG. 5 shows an overall flow for a Cloud Vault Service according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 510, a Cloud Vault Service is established at a public cloud. In a specific embodiment, a provider of the Cloud Vault Service is different from a provider of the public cloud. The Cloud Vault Service, however, is designed to work and operate within the technical constraints that may be enforced by each of the different public cloud providers. The Cloud Vault Service can operate using the native cloud services offered by a public cloud.

More particularly, in a specific embodiment, the establishing includes creating a cloud account in the public cloud so that a provider of the Cloud Vault Service becomes a tenant in the public cloud. Creating the cloud account may include accessing a web page of the public cloud, entering account information (e.g., name, company name, contact information, mailing address, e-mail address, phone number), billing information, user identifier, and password. In an embodiment, the Cloud Vault Service runs in a tenant account in the public cloud along with other customers of the public cloud. These other customers also have their own specific tenant accounts in the public cloud in which their respective applications run and their respective data is stored.

In a step 515, data moving micro-services are deployed at the public cloud and Cloud Vault Targets. As discussed, these data moving micro-services are scalable. For example, instances of the micro-service may be added in response to an increase in demand or activity. Instances of the micro-service may be reduced in response to a decrease in demand or activity.

Figure 6:
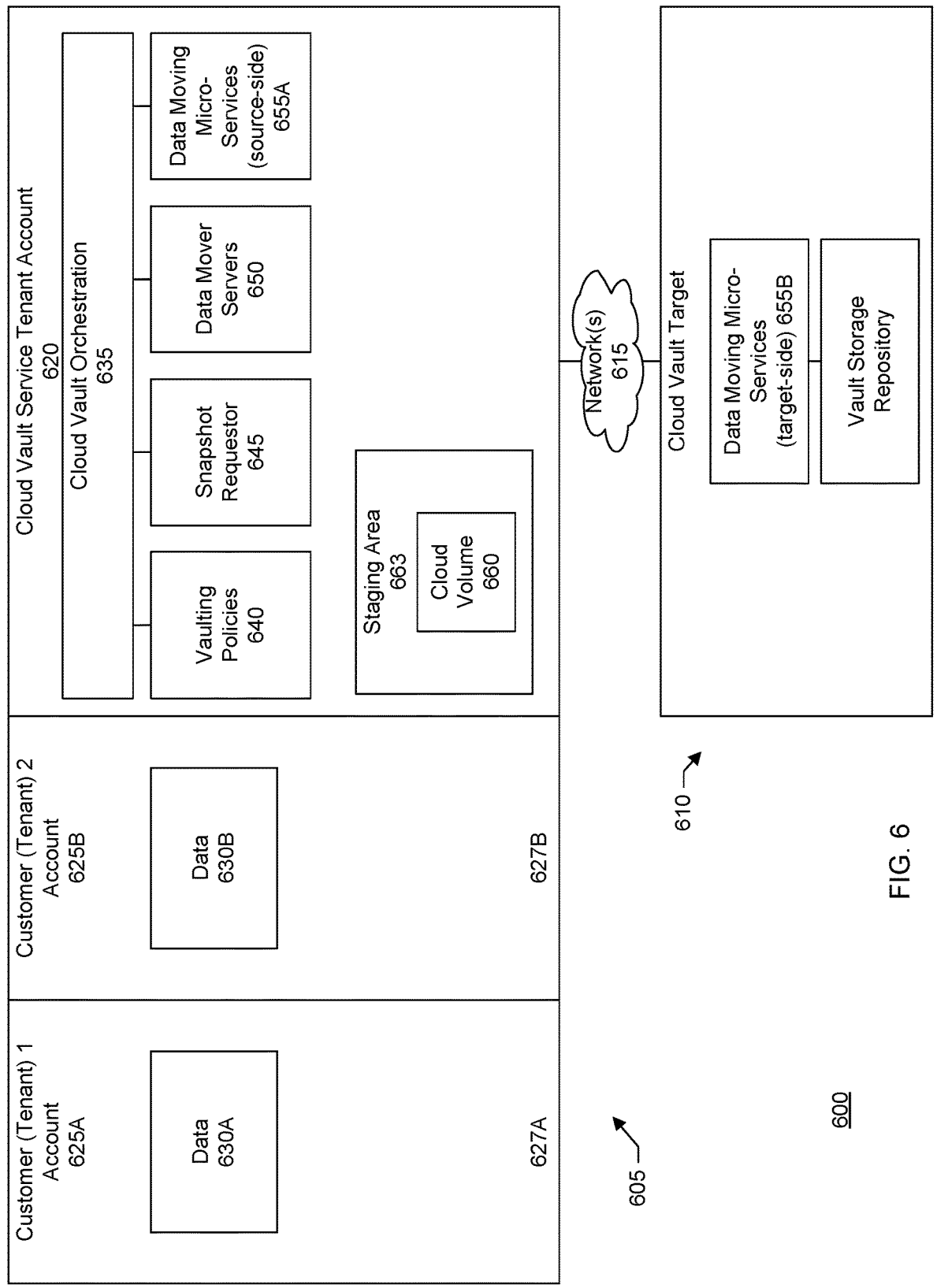
FIG. 6 shows further detail of a block diagram for vaulting data, according to one or more embodiments.

FIG. 6 shows another block diagram of a system 600 in which the Cloud Vault Service may be implemented. This system includes a public cloud 605 and one or more Cloud Vault Targets 610 connected by a network 615. A Cloud Vault Service tenant account 620 is established in the public cloud (step 510, FIG. 5). The public cloud includes multiple other tenant accounts associated with other customers of the public cloud. For example, there can be a first tenant account 625A belonging to a first customer 627A, and a second tenant account 625B belonging to a second customer 627B, different from the first customer. The first tenant account may include first data 630A belonging to the first customer. The second tenant account may include second data 630B belonging to the second customer.

In the example shown in FIG. 6, the Cloud Vault Service includes several components, units, or modules such as a cloud vault orchestration engine 635, vaulting policies 640, snapshot requestor 645, data mover servers 650, data moving micro-services 655A deployed at the public cloud (e.g., source-side data moving micro-services), and data moving micro-services 655B deployed at the Cloud Vault Targets (e.g., target-side data moving micro-services) (step 515, FIG. 5). It should be appreciated that the blocks shown in FIG. 6 may be functional and there can be many different hardware and software configurations to implement the functions described.

Referring back now to FIG. 5, in a step 517, subscription requests for subscribing to the Cloud Vault Service are received. In a specific embodiment, the requests are from existing customer tenants of the public cloud who would like to subscribe to the Cloud Vault Service. The subscription may be accompanied by an authorization to allow the Cloud Vault Service to access the cloud account of the customer so that the Cloud Vault Service can vault the customer's data to the Cloud Vault Target and recall the vaulted data from the Cloud Vault Target back to the customer's cloud account.

In a specific embodiment, the Cloud Vault Service creates logical storage containers in the public cloud for the customers that have subscribed to the Cloud Vault Service. For example, a first logical storage container may be created for a first customer. A second logical container may be created for a second customer. The logical containers are used to store data of a particular customer and help to ensure that each customer's data remains isolated and separated from the data of other customers. The logical storage containers may be created in the cloud account of the Cloud Vault Service, the cloud account of a customer tenant, or both.

In a step 520, vaulting policies 640 (FIG. 6) are defined for the various customer tenants in the public cloud who have subscribed to the Cloud Vault Service. As discussed, these policies relate to the copying (e.g., vaulting) of data from the public cloud to one or more Cloud Vault Targets. In a specific embodiment, the Cloud Vault Service includes a policy builder interface that may be presented via a web browser to a customer. The customer can use the policy builder interface to specify and identify the data sources in the public cloud to be vaulted, the specific Cloud Vault Targets to which the data should be vaulted, retention periods for the vaulted data, a vaulting schedule (e.g., daily, weekly, or any time interval as desired), whether or not customer data is allowed to reside in the cloud account of the Cloud Vault Service, and other options.

For example, a first customer tenant may define first vaulting policies that specify a first particular instance associated with the first customer tenant is to be vaulted daily while a first particular storage volume associated with the first customer tenant is to be vaulted weekly. The first customer tenant may authorize their data to reside in the cloud account of the Cloud Vault Service. A second customer tenant may define second vaulting policies, different from the first vaulting policies, that specify a second particular instance associated with the second customer tenant is to be vaulted weekly while a second particular storage volume associated with the second customer tenant is to be vaulted daily. The second customer tenant may prohibit or not allow their data to reside in the cloud account of the Cloud Vault Service.

In a step 525, upon a determination that an identified data source of a customer tenant in the public cloud is to be vaulted, a request for a snapshot of the data is issued by the Cloud Vault Service (e.g., by snapshot requestor 645, FIG. 6) to the public cloud. The determination may be the result of tracking or monitoring a pre-determined vaulting schedule according to a vaulting policy or receiving an on-demand request from the customer to vault the data.

In a specific embodiment, the Cloud Vault Service issues the snapshot request to a snapshot service or framework that is native to the public cloud. That is, the Cloud Vault Service leverages a snapshot service that is provided by or built-into the public cloud. Using the native snapshot service of the public cloud helps to ensure good performance and reliability because the snapshot service has been created and optimized by the provider of the public cloud for their specific public cloud. The snapshot request can include information identifying the data source for the snapshot. Such information may include, for example, the cloud account of the customer tenant that is associated with the data source. A snapshot provides a point-in-time copy of a particular data source. Snapshots can be created very quickly because a snapshot is a virtual copy of data rather than a physical copy. There can be many different ways to create a snapshot such as copy-on-write, redirect-on-write, and others.

In a step 530, the snapshot of the data can be immediately accessed by the Cloud Vault Service to write the data to a cloud volume in the public cloud. For example, as shown in FIG. 6, the data may be written to a cloud volume 660 in a staging area 663 of the Cloud Vault Service tenant account. The staging area may be associated with a logical storage container created for the customer. During the writing using the snapshot, the customer can continue with their normal business and processing operations in the public cloud.

More particularly, in a specific embodiment, the Cloud Vault Service generates copies of the tenant data which may be referred to as cloud volumes. A cloud volume may include a physical copy of the tenant data. In a specific embodiment, the Cloud Vault Service uses the native snapshot functionality in the public cloud to take a snapshot of the tenant data and write that data into a cloud account of the Cloud Vault Service. The data may then be compressed, deduplicated, and replicated, copied, or moved from the cloud account of the Cloud Vault Service to one or more Cloud Vault Targets.

The data may be transformed from a first format to a second format, different from the first format, depending, for example, on the type of data source to be vaulted. For example, if the data source includes a database (e.g., Amazon Relational Database Service (RDS)), the Cloud Vault Service may request an export of the database. The export allows the data in the database to be stored in a format that can be accessible outside the public cloud. For example, a database export of an Amazon RDS database can decouple the data from the AWS Cloud and allow the database export to be imported into a different public cloud (e.g., Microsoft Azure) that may provide for a different database application (e.g., SQL Server).

In an embodiment, the Cloud Vault Service utilizes application-dependent techniques to extract the data to be vaulted rather than infrastructure-dependent techniques so that the vaulted data is not tied to any specific public cloud. That is, the vaulted data may be independent of the public cloud from which the data originated. This allows the vaulted data to be recalled into other public clouds and accessed by an appropriate application or service running in the other public clouds, rather than only into the public cloud where the data originated.

Referring back now to FIG. 5, in a step 535, data moving micro-services at the public cloud and corresponding data moving micro-services at the Cloud Vault Target are scaled up. In a step 540, a cloud vault orchestration engine of the Cloud Vault Service directs coordination between the data moving micro-services at the public cloud and the data moving micro-services at the Cloud Vault Target to read the data in the cloud volume, and replicate the data in the cloud volume from the public cloud to the Cloud Vault Target.

More particularly, once the data to be vaulted has been staged to the cloud volume at the public cloud, a handshake is initiated and performed between the data moving microservice at the public cloud and the data moving microservice at the Cloud Vault Target. The handshake may include, for example, a negotiation between the two endpoints, key exchange, and authentication in order to establish a connection between the two endpoints (e.g., public cloud and Cloud Vault Target).

The data may be replicated to any number of different Cloud Vault Targets according to a customer's vaulting policy. A Cloud Vault Target may be located anywhere in the world. For example, the customer may specify that data is to be vaulted to a first Cloud Vault Target located in a first geographical location (e.g., Emporia, Kans.) and to a second Cloud Vault Target located in a second geographical location (e.g., Sydney, Australia), different from the first geographical location.

Having the data moving micro-services running at both endpoints (e.g., source endpoint at the public cloud and destination endpoint at the Cloud Vault Target) provides for an efficient transfer of data because it helps to ensure that data is not replicated twice. For example, the replication may include deduplication operations. Deduplication helps to prevent the transmission of redundant data and conserves network bandwidth.

For example, in an embodiment, a data object to be vaulted may be segmented and fingerprints (e.g., hashes) may be calculated for the segments. The fingerprints may be compared against a fingerprint or deduplication index identifying segments already existing at the Cloud Vault Target. A matching fingerprint indicates that the corresponding data segment already exists at the Cloud Vault Target and therefore does not have to be transmitted to the Cloud Vault Target. A non-matching fingerprint indicates that the corresponding data segment does not exist at the Cloud Vault Target and should be transmitted to the Cloud Vault Target. The replication may further include data compression operations to reduce the traffic over the network, encryption operations to secure the data, or both.

In a specific embodiment, the data moving micro-services provide for data aggregation (e.g., all data across tenants passes through the data moving micro-services), efficient data movement (e.g., from public cloud to vault service provider and over-the-wire deduplication and compression); efficient data storage (e.g., elastic cloud storage, the data moving micro-services can deduplicate the snapshot volume copies which are each full copies); and per tenant encryption.

In a step 545, after the data in the cloud volume has been vaulted, the cloud volume is maintained in the public cloud (e.g., remains stored at the public cloud). Maintaining the cloud volume can facilitate efficient deduplicated replication to the Cloud Vault Targets on an ongoing basis. For example, at a time of a next vaulting, the data of a new cloud volume can be compared against the data of the previous cloud volume such as via fingerprint matching. This helps to ensure that redundant data is not transmitted. In another specific embodiment, the cloud volume is not maintained at the public cloud. For example, the cloud volume may be deleted from the public cloud after it has been replicated to a Cloud Vault Target. Not maintaining the cloud volume at the public cloud can reduce storage costs, but can decrease the efficiency of replication and recalling data from the Cloud Vault Target. In a specific embodiment, the Cloud Vault Service provides customers with the option of maintaining or not maintaining a cloud volume at the public cloud.

In a step 550, after the data has been vaulted, the data moving micro-services at the public cloud and the Cloud Vault Target are scaled down. This helps to conserve resources and reduce the cost of operating the Cloud Vault Service.

Figure 7:
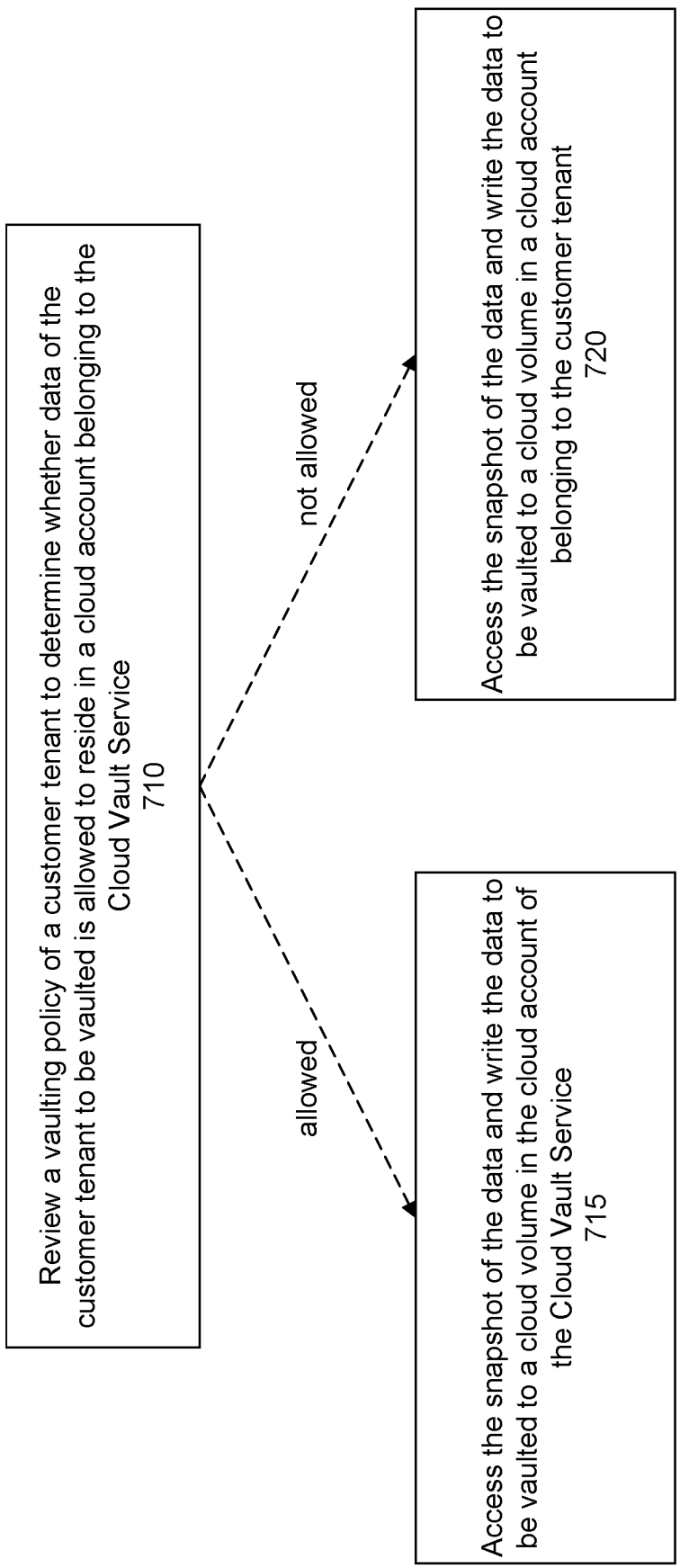
FIG. 7 shows a flow for determining where a cloud volume is to reside, according to one or more embodiments.

FIG. 7 shows further detail of a flow for vaulting data. In a step 710, prior to vaulting a customer's data, a vaulting policy of the customer tenant is reviewed to determine whether the data to be vaulted is allowed to reside in a public cloud account belonging to the provider of the Cloud Vault Service.

In a step 715, when allowed, the snapshot of the data to be vaulted (step 530, FIG. 5) is accessed to write the data to a cloud volume that resides in the cloud account belonging to the provider of the Cloud Vault Service.

As discussed, however, some customers may not want their data to reside in the cloud account of the Cloud Vault Service. Thus, in a step 720, when not allowed, the data to be vaulted is written to a cloud volume that resides in the cloud account of the customer. That is, the data may be written to a cloud volume that is in a logical storage container within the cloud account of the customer.

Figure 8:
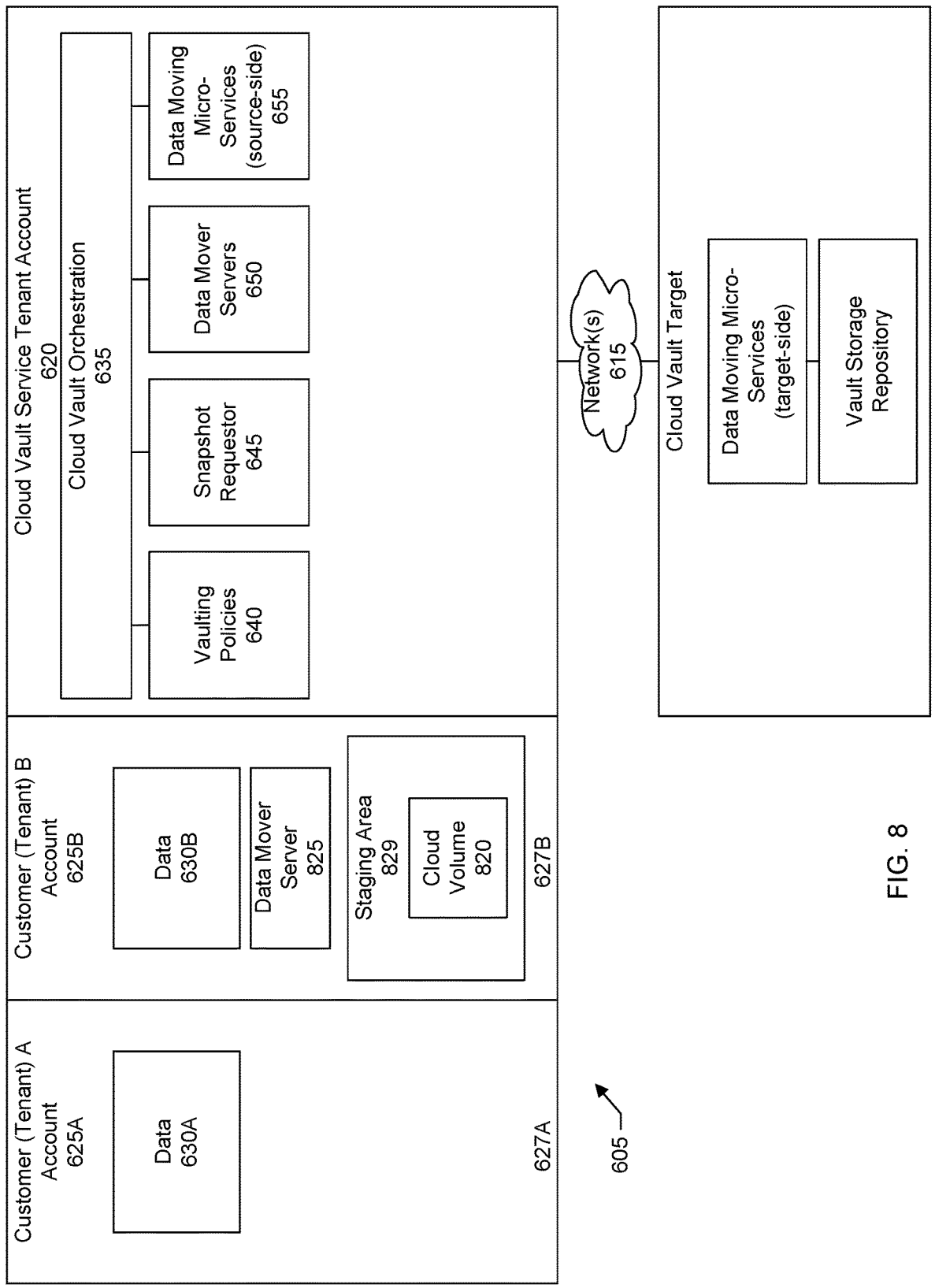
FIG. 8 shows further detail of another block diagram for vaulting the data, according to one or more embodiments.

Consider, as an example, the block diagram shown in FIG. 8. FIG. 8 is similar to FIG. 6. In FIG. 8, however, second customer 627B has indicated that they do not allow the cloud volume to reside in cloud account 620 of the Cloud Vault Service. Thus, in this case, a cloud volume 820 having the data to be vaulted of the second customer resides in second cloud account 625B belonging to the second customer rather than cloud account 620 associated with the Cloud Vault Service. A data mover server 825 is deployed in the cloud account of the second customer to which the cloud volume is mounted. The Cloud Vault Service can be given access or permission to a staging area or storage container 829 of the second cloud account in which the cloud volume resides in order to read the cloud volume and replicate the data to a Cloud Vault Target. Thus, the customer's cloud account can serve as a staging area for vaulting the data. The customer's security concerns can be addressed while still being afforded the benefits of a shared service.

In a specific embodiment, the Cloud Vault Service establishes a set of logical containers in the public cloud. The logical containers may be in a cloud account belonging to the Cloud Vault service. Each customer of the Cloud Vault Service is assigned a particular logical container to which data of the customer to be vaulted may be staged in a cloud volume. In a specific embodiment, the Cloud Vault Service further maintains a set of deduplication indexes, each index corresponding to a different customer, in the cloud account belonging to the Cloud Vault Service. For example, a first deduplication index for a first customer may be maintained in a first logical storage container in the cloud account of the Cloud Vault Service. A second deduplication index for a second customer may be maintained in a second logical storage container in the cloud account of the Cloud Vault Service. Instead or additionally, a logical container storing the cloud volume (and deduplication index) may be established within a cloud account belonging to the customer tenant in order to satisfy security requirements of the customer.

In a specific embodiment, the Cloud Vault Service associates each customer tenant with a particular logical container, and a particular instance of a data moving micro-service. This helps to ensure isolation and separation of the data belonging to each customer tenant. The particular logical container stores one or more cloud volumes and a deduplication index associated with a particular customer tenant. The particular data moving micro-service is responsible for deduplicating and replicating data in the one or more cloud volumes associated with the particular customer tenant to one or more Cloud Vault Targets as specified in a particular vaulting policy associated with the particular customer tenant. In a specific embodiment, the particular logical container is in a cloud account belonging to a provider of the Cloud Vault Service. In another specific embodiment, the particular logical container is in a cloud account belonging to the particular customer.

Figure 9:
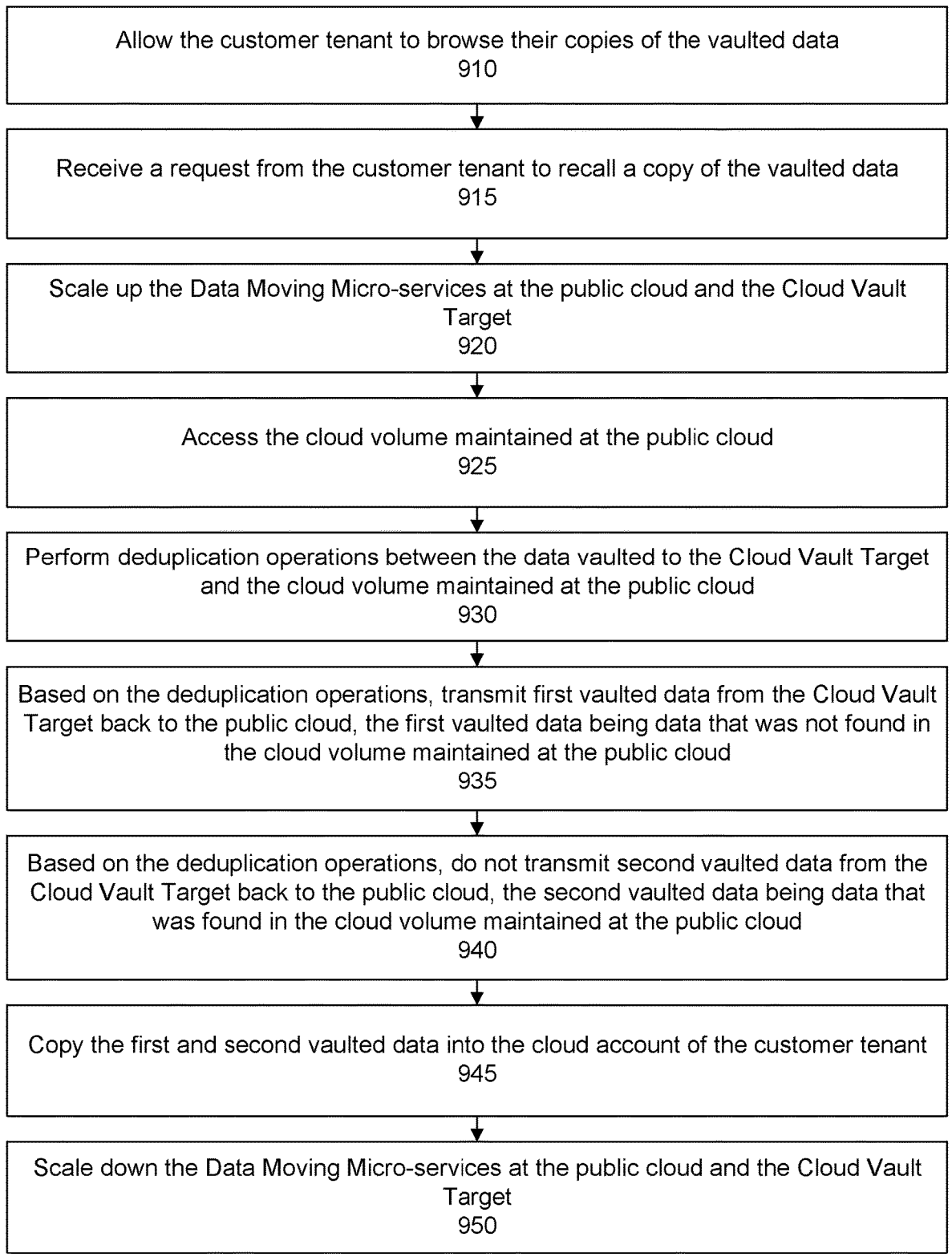
FIG. 9 shows a flow for recalling vaulted data, according to one or more embodiments.

FIG. 9 shows a flow for recalling data from a Cloud Vault Target back to the public cloud. In a step 910, a customer tenant may use a web browser to browse their copies of the vaulted data. For example, in a specific embodiment, a service provider of the Cloud Vault Target may provide for an online portal or catalog that the customer may log into and view the various vaulted data sets. The catalog may include, for example, a listing of the data sets that have been vaulted, an identification (e.g., name) of each data set, a time and date that the data set was vaulted, and other metadata. Different cloud vault service providers may offer different value-added services in addition to vault storage such as forensic analysis, creation of disaster recovery environments, recall of vaulted data back into different public clouds, and so forth. Instead or additionally, the Cloud Vault Service may maintain an online catalog listing the various data sets that have been vaulted including an identification of one or more Cloud Vault Targets storing the vaulted data.

In a step 915, a request is received from the customer tenant to recall a copy of the vaulted data.

In a step 920, the data moving micro-services previously deployed at the public cloud and Cloud Vault Targets are scaled up. Generally, the data flow for recalling vaulted data is similar to the data flow for vaulting the data, but in reverse order. For example, data movement operations such as deduplication, replication, compression, encryption, or combinations of these may likewise be performed to fulfill the request to recall the vaulted data.

In a specific embodiment, the cloud volume maintained at the public cloud and associated with the vaulted data is accessed (step 925). Deduplication and replication operations are performed between the data vaulted to the Cloud Vault Target and the cloud volume maintained at the public cloud. For example, based on the deduplication operations, first vaulted data may be transmitted over the network from the Cloud Vault Target back to the public cloud, where the first vaulted data is data that was not found in the cloud volume maintained at the public cloud (step 935).

Based on the deduplication operations, second vaulted data may not be transmitted from the Cloud Vault Target back to the public cloud, where the second vaulted data is data that was found in the cloud volume maintained at the public cloud (step 940). In other words, if the data already exists on the cloud volume in the public cloud the Cloud Vault Service does not retransmit the data. The Cloud Vault Service only transmits unique data to bring the volume back to a previous known state.

In a step 945, the first and second vaulted data are copied into the cloud account of the customer tenant of the public cloud.

In a step 950, upon fulfillment of the recall request, the data moving micro-services at the public cloud and Cloud Vault Target are scaled down.

A benefit of the Cloud Vault Service is that the Cloud Vault Service can operate on the side and out-of-band, rather than operating as a layer or filesystem on top of the public cloud storage. This provides for a very efficient, flexible, and scalable system. For example, as discussed, in a specific embodiment, the Cloud Vault Service leverages the public cloud's snapshot capability to obtain a copy of the data to vault. The snapshot is used to stage the data to a cloud volume in the public cloud. The data can then be efficiently vaulted out to a Cloud Vault Target—all the while the customer continues with their usual course of operations using the native filesystem of the public cloud. The Cloud Vault Service does not sit between the customer and the public cloud. The customer can continue with their own operations while the Cloud Vault Service sits on the sideline and accesses the snapshot to perform the vaulting operations.

The Cloud Vault Service overcomes the limitations (economic and technical) public cloud providers impose on their customers when they want to copy data to targets that reside outside the public cloud.

Today if public cloud customers want to take copies of their cloud volumes to offsite facilities they need to design, deploy and implement their own solution. The solution would involve numerous components (servers, deduplicated storage, deduplicated replication) which are expensive (e.g., they do not scale-down when there is no demand) to maintain and operate in the public cloud on a per-customer basis. They would also require software development and integration with public cloud vendors snapshot APIs to facilitate the orchestration and transportation of data copies between the public cloud and the offsite locations. All-in-all it would be prohibitively expensive for each customer to produce their own bespoke solution. This disclosure addresses the problem by providing the solution as a service and utilizing a collection of shared services to achieve economies of scale.

Large capital outlays are required to setup storage targets for Cloud Vaulting Services. In a specific embodiment, the problem may be addressed by partnering with existing Vault Service Providers to fulfill the requirements of the Cloud Vault Targets.

In a specific embodiment, there is a method of vaulting data of a tenant in a public cloud to a cloud vault target comprising: deploying a data moving micro-service to the public cloud, and another data moving micro-service to the cloud vault target, the public cloud being owned by a first entity, and the cloud vault target being owned by a second entity, different from the first entity; issuing a request to the public cloud for a snapshot of the data; accessing the snapshot to write the data to a cloud volume in the public cloud; and directing coordination between the data moving micro-service at the public cloud and the other data moving micro-service at the cloud vault target to read the data in the cloud volume, and deduplicate and replicate the data in the cloud volume from the public cloud to the cloud vault target.

The method may further comprise: after the cloud volume has been deduplicated and replicated to the cloud vault target, maintaining the cloud volume in the public cloud; receiving a request from the tenant to recall the vaulted data; performing deduplication operations between the data vaulted to the cloud vault target and the cloud volume; based on the deduplication operations, replicating first vaulted data from the cloud vault target back to the public cloud, the first vaulted data being data that was not found in the cloud volume maintained in the public cloud; not replicating second vaulted data from the cloud vault target back to the public cloud, the second vaulted data being data that was found in the cloud volume maintained in the public cloud; and copying the first and second vaulted data into a cloud account of the tenant in the public cloud.

In a specific embodiment, the tenant is a first tenant, and the cloud volume is associated with a cloud account belonging to a cloud vaulting services tenant in the public cloud, different from the first tenant. In another specific embodiment, the tenant is a first tenant, and the cloud volume is associated with a cloud account belonging to the first tenant.

In a specific embodiment, the method further comprises: during the directing the coordination, dynamically scaling up a number of instances of the data moving micro-service at the public cloud, and a number of instances of the other data moving micro-service at the cloud vault target; and after the data in the cloud volume has been deduplicated and replicated to the cloud vault target, dynamically scaling down the number of instances of the data moving micro-service at the public cloud, and the number of instances of the other data moving micro-service at the cloud vault target.

In a specific embodiment, the tenant is a first tenant, the cloud volume is a first cloud volume, and the method further comprises: consulting a first vaulting policy specified by the first tenant, the first vaulting policy indicating that the data of the first tenant is allowed to reside in a cloud account belonging to a cloud vaulting services tenant in the public cloud, the first cloud volume to which the data of the first tenant was written thereby residing in the cloud account belonging to the cloud vaulting services tenant; determining that data of a second tenant in the public cloud should be vaulted from the public cloud to a second cloud vault target; consulting a second vaulting policy specified by the second tenant, the second vaulting policy indicating that the data of the second tenant is not allowed to reside in the cloud account belonging to the cloud vaulting services tenant; issuing a second request to the public cloud for a second snapshot of the data of the second tenant; accessing the second snapshot to write the data of the second tenant to a second cloud volume in the public cloud, wherein the second cloud volume to which the data of the second tenant is written to resides in a cloud account belonging to the second tenant and not the cloud vaulting services tenant; and directing coordination between an instance of the data moving micro-service at the public cloud and an instance of the data moving micro-service at the second cloud vault target to read the data in the second cloud volume, and deduplicate and replicate the data in the second cloud volume from the public cloud to the second cloud vault target.

Figure 10:
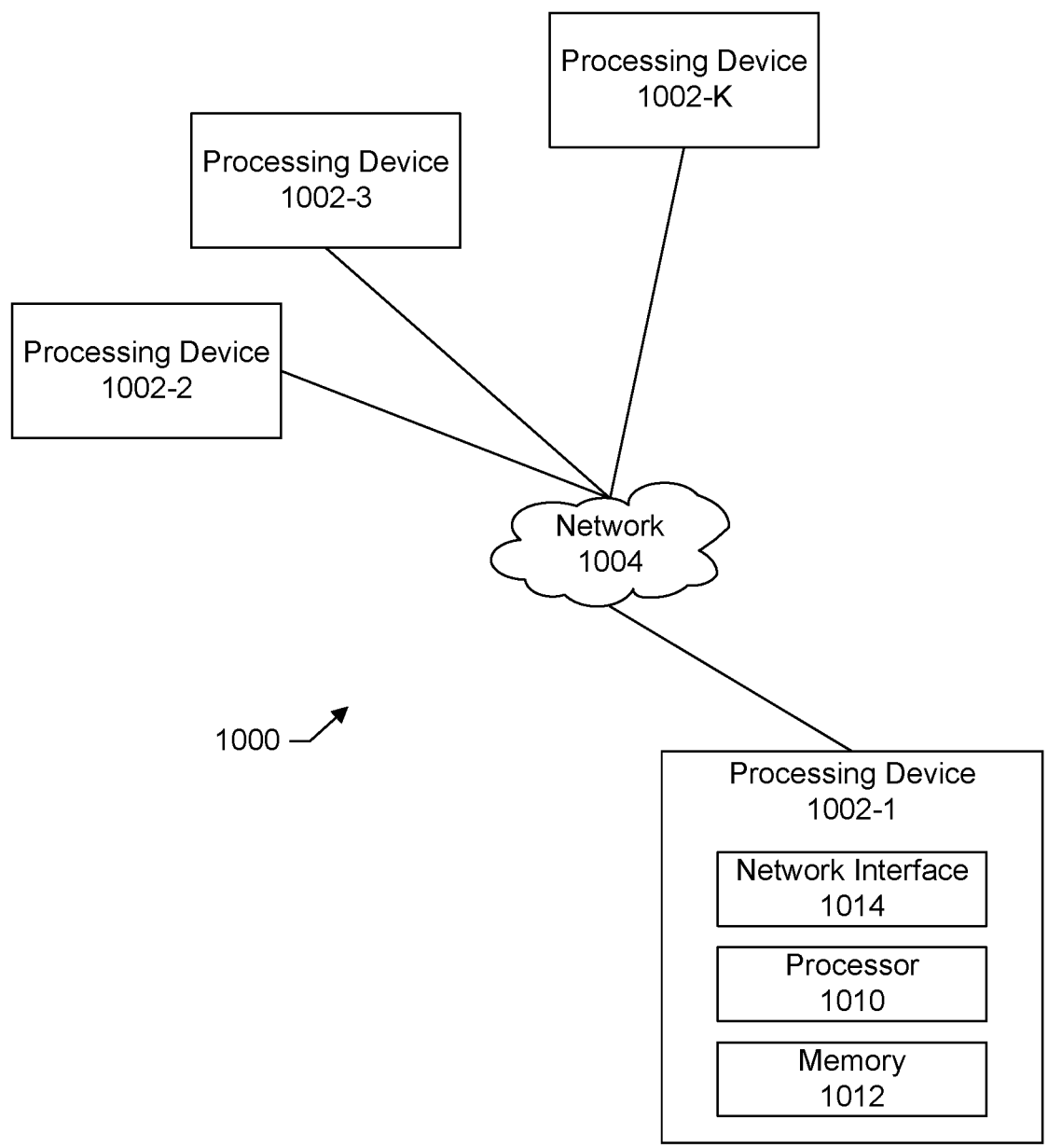
FIG. 10 shows another block diagram of a processing platform that may be utilized to implement at least a portion of an information processing system, according to one or more embodiments.

FIG. 10 shows an example of a processing platform 1000. The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 11:
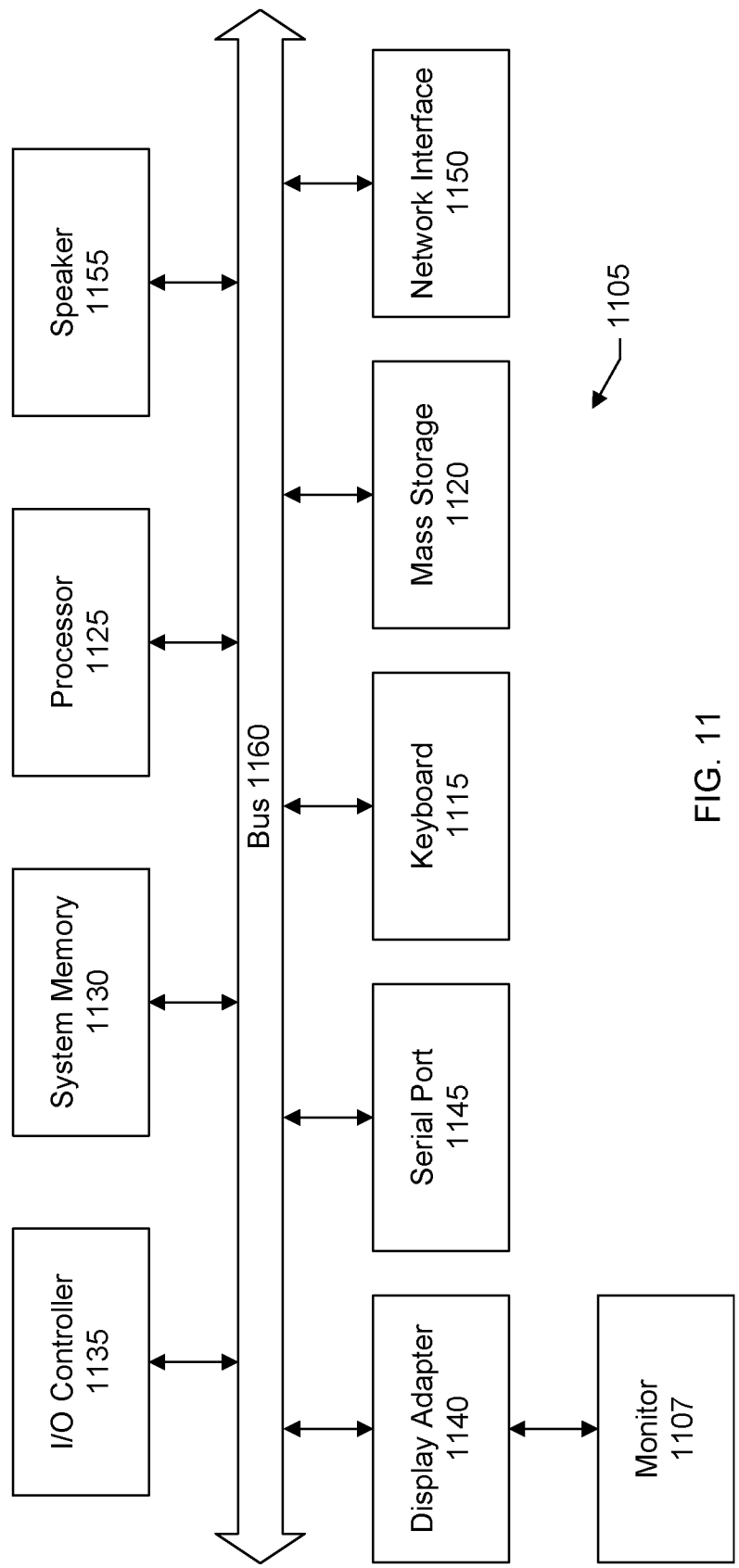
FIG. 11 shows a block diagram of a computer system suitable for use with the information processing system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of vaulting data of a tenant in a public cloud to a cloud vault target comprising:
   allowing the tenant to define a vaulting policy, the vaulting policy specifying data sources in the public cloud to be vaulted, the cloud vault target to which the data should be vaulted, retention periods for the vaulted data, a vaulting schedule, credentials to allow a cloud vault service to vault the data, and access authorization by the cloud vault service to the data sources in a cloud account of the tenant;
   deploying a data moving micro-service to the public cloud, and another data moving micro-service to the cloud vault target, the public cloud being owned by a first entity, and the cloud vault target being owned by a second entity, different from the first entity;
   issuing a request to the public cloud for a snapshot of the data;
   accessing the snapshot to write the data to a cloud volume in the public cloud; and
   directing coordination between the data moving micro-service at the public cloud and the other data moving micro-service at the cloud vault target to read the data in the cloud volume, and deduplicate and replicate the data in the cloud volume from the public cloud to the cloud vault target as specified in the vaulting policy.

2. The method of claim 1 further comprising:
   after the cloud volume has been deduplicated and replicated to the cloud vault target, maintaining the cloud volume in the public cloud;
   receiving a request from the tenant to recall the vaulted data;
   performing deduplication operations between the data vaulted to the cloud vault target and the cloud volume;
   based on the deduplication operations, replicating first vaulted data from the cloud vault target back to the public cloud, the first vaulted data being data that was not found in the cloud volume maintained in the public cloud;
   not replicating second vaulted data from the cloud vault target back to the public cloud, the second vaulted data being data that was found in the cloud volume maintained in the public cloud; and
   copying the first and second vaulted data into a cloud account of the tenant in the public cloud.

3. The method of claim 1 wherein the tenant is a first tenant, and the cloud volume is associated with a cloud account belonging to a cloud vaulting services tenant in the public cloud, different from the first tenant.

4. The method of claim 1 wherein the tenant is a first tenant, and the cloud volume is associated with a cloud account belonging to the first tenant.

5. The method of claim 1 further comprising:
   during the directing the coordination, dynamically scaling up a number of instances of the data moving microservice at the public cloud, and a number of instances of the other data moving micro-service at the cloud vault target; and after the data in the cloud volume has been deduplicated and replicated to the cloud vault target, dynamically scaling down the number of instances of the data moving micro-service at the public cloud, and the number of instances of the other data moving micro-service at the cloud vault target.

6. The method of claim 1 wherein the tenant is a first tenant, the cloud volume is a first cloud volume, and the method further comprises:

consulting a first vaulting policy specified by the first tenant, the first vaulting policy indicating that the data of the first tenant is allowed to reside in a cloud account belonging to a cloud vaulting services tenant in the public cloud, the first cloud volume to which the data of the first tenant was written thereby residing in the cloud account belonging to the cloud vaulting services tenant;

determining that data of a second tenant in the public cloud should be vaulted from the public cloud to a second cloud vault target;

consulting a second vaulting policy specified by the second tenant, the second vaulting policy indicating that the data of the second tenant is not allowed to reside in the cloud account belonging to the cloud vaulting services tenant;

issuing a second request to the public cloud for a second snapshot of the data of the second tenant;

accessing the second snapshot to write the data of the second tenant to a second cloud volume in the public cloud, wherein the second cloud volume to which the data of the second tenant is written to resides in a cloud account belonging to the second tenant and not the cloud vaulting services tenant; and directing coordination between an instance of the data moving micro-service at the public cloud and an instance of the data moving micro-service at the second cloud vault target to read the data in the second cloud volume, and deduplicate and replicate the data in the second cloud volume from the public cloud to the second cloud vault target.

7. A system comprising: a processor; and memory configured to store one or more sequences of instructions which, when executed by the processor, cause the processor to carry out the steps of:

allowing a tenant to define a vaulting policy, the vaulting policy specifying data sources in a public cloud to be vaulted, a cloud vault target to which the data should be vaulted, retention periods for the vaulted data, a vaulting schedule, credentials to allow a cloud vault service to vault the data, and access authorization by the cloud vault service to the data sources in a cloud account of the tenant;

deploying a data moving micro-service to the public cloud, and another data moving micro-service to the cloud vault target, the public cloud being owned by a first entity, and the cloud vault target being owned by a second entity, different from the first entity;

issuing a request to the public cloud for a snapshot of the data;

accessing the snapshot to write the data to a cloud volume in the public cloud; and directing coordination between the data moving micro-service at the public cloud and the other data moving micro-service at the cloud vault target to read the data in the cloud volume, and deduplicate and replicate the data in the cloud volume from the public cloud to the cloud vault target as specified in the vaulting policy.

8. The system of claim 7 wherein the processor further carries out the steps of:

after the cloud volume has been deduplicated and replicated to the cloud vault target, maintaining the cloud volume in the public cloud;

receiving a request from the tenant to recall the vaulted data;

performing deduplication operations between the data vaulted to the cloud vault target and the cloud volume;

based on the deduplication operations, replicating first vaulted data from the cloud vault target back to the public cloud, the first vaulted data being data that was not found in the cloud volume maintained in the public cloud;

not replicating second vaulted data from the cloud vault target back to the public cloud, the second vaulted data being data that was found in the cloud volume maintained in the public cloud; and copying the first and second vaulted data into a cloud account of the tenant in the public cloud.

9. The system of claim 7 wherein the tenant is a first tenant, and the cloud volume is associated with a cloud account belonging to a cloud vaulting services tenant in the public cloud, different from the first tenant.

10. The system of claim 7 wherein the tenant is a first tenant, and the cloud volume is associated with a cloud account belonging to the first tenant.

11. The system of claim 7 wherein the processor further carries out the steps of:

during the directing the coordination, dynamically scaling up a number of instances of the data moving micro-service at the public cloud, and a number of instances of the other data moving micro-service at the cloud vault target; and after the data in the cloud volume has been deduplicated and replicated to the cloud vault target, dynamically scaling down the number of instances of the data moving micro-service at the public cloud, and the number of instances of the other data moving micro-service at the cloud vault target.

12. The system of claim 7 wherein the tenant is a first tenant, the cloud volume is a first cloud volume, and the processor further carries out the steps of:

consulting a first vaulting policy specified by the first tenant, the first vaulting policy indicating that the data of the first tenant is allowed to reside in a cloud account belonging to a cloud vaulting services tenant in the public cloud, the first cloud volume to which the data of the first tenant was written thereby residing in the cloud account belonging to the cloud vaulting services tenant;

determining that data of a second tenant in the public cloud should be vaulted from the public cloud to a second cloud vault target;

consulting a second vaulting policy specified by the second tenant, the second vaulting policy indicating that the data of the second tenant is not allowed to reside in the cloud account belonging to the cloud vaulting services tenant;

issuing a second request to the public cloud for a second snapshot of the data of the second tenant;

accessing the second snapshot to write the data of the second tenant to a second cloud volume in the public cloud, wherein the second cloud volume to which the data of the second tenant is written to resides in a cloud account belonging to the second tenant and not the cloud vaulting services tenant; and directing coordination between an instance of the data moving micro-service at the public cloud and an instance of the data moving micro-service at the second cloud vault target to read the data in the second cloud volume, and deduplicate and replicate the data in the second cloud volume from the public cloud to the second cloud vault target.

13. A computer program product, comprising a non-transitory computer-readable medium having a computer-readable program code embodied therein, the computer-readable program code adapted to be executed by one or more processors to implement a method comprising:

allowing a tenant to define a vaulting policy, the vaulting policy specifying data sources in a public cloud to be vaulted, a cloud vault target to which the data should be vaulted, retention periods for the vaulted data, a vaulting schedule, credentials to allow a cloud vault service to vault the data, and access authorization by the cloud vault service to the data sources in a cloud account of the tenant;

deploying a data moving micro-service to the public cloud, and another data moving micro-service to the cloud vault target, the public cloud being owned by a first entity, and the cloud vault target being owned by a second entity, different from the first entity;

issuing a request to the public cloud for a snapshot of the data;

accessing the snapshot to write the data to a cloud volume in the public cloud; and directing coordination between the data moving micro-service at the public cloud and the other data moving micro-service at the cloud vault target to read the data in the cloud volume, and deduplicate and replicate the data in the cloud volume from the public cloud to the cloud vault target as specified in the vaulting policy.

14. The computer program product of claim 13 wherein the method further comprises:

after the cloud volume has been deduplicated and replicated to the cloud vault target, maintaining the cloud volume in the public cloud;

receiving a request from the tenant to recall the vaulted data;

performing deduplication operations between the data vaulted to the cloud vault target and the cloud volume;

based on the deduplication operations, replicating first vaulted data from the cloud vault target back to the public cloud, the first vaulted data being data that was not found in the cloud volume maintained in the public cloud;

not replicating second vaulted data from the cloud vault target back to the public cloud, the second vaulted data being data that was found in the cloud volume maintained in the public cloud; and copying the first and second vaulted data into a cloud account of the tenant in the public cloud.

15. The computer program product of claim 13 wherein the tenant is a first tenant, and the cloud volume is associated with a cloud account belonging to a cloud vaulting services tenant in the public cloud, different from the first tenant.

16. The computer program product of claim 13 wherein the tenant is a first tenant, and the cloud volume is associated with a cloud account belonging to the first tenant.

17. The computer program product of claim 13 wherein the method further comprises:

during the directing the coordination, dynamically scaling up a number of instances of the data moving micro-service at the public cloud, and a number of instances of the other data moving micro-service at the cloud vault target; and after the data in the cloud volume has been deduplicated and replicated to the cloud vault target, dynamically scaling down the number of instances of the data moving micro-service at the public cloud, and the number of instances of the other data moving micro-service at the cloud vault target.

18. The computer program product of claim 13 wherein the tenant is a first tenant, the cloud volume is a first cloud volume, and the method further comprises:

consulting a first vaulting policy specified by the first tenant, the first vaulting policy indicating that the data of the first tenant is allowed to reside in a cloud account belonging to a cloud vaulting services tenant in the public cloud, the first cloud volume to which the data of the first tenant was written thereby residing in the cloud account belonging to the cloud vaulting services tenant;

determining that data of a second tenant in the public cloud should be vaulted from the public cloud to a second cloud vault target;

consulting a second vaulting policy specified by the second tenant, the second vaulting policy indicating that the data of the second tenant is not allowed to reside in the cloud account belonging to the cloud vaulting services tenant;

issuing a second request to the public cloud for a second snapshot of the data of the second tenant;

accessing the second snapshot to write the data of the second tenant to a second cloud volume in the public cloud, wherein the second cloud volume to which the data of the second tenant is written to resides in a cloud account belonging to the second tenant and not the cloud vaulting services tenant; and directing coordination between an instance of the data moving micro-service at the public cloud and an instance of the data moving micro-service at the second cloud vault target to read the data in the second cloud volume, and deduplicate and replicate the data in the second cloud volume from the public cloud to the second cloud vault target.

* * * * *